United States Patent [19]

Matsumoto et al.

[11] 4,011,386
[45] Mar. 8, 1977

[54] PROCESS FOR PRODUCING POLYMERS OR COPOLYMERS OF NORBORNENE-CARBOXYLIC ACID AMIDES

[75] Inventors: Shuichi Matsumoto, Yokohama; Ryuichi Nakamura, Tokyo; Seiji Fukuhara, Kawasaki; Kazuo Suzuki, Yokohama; Koei Komatsu, Tokyo, all of Japan

[73] Assignee: Japan Synthetic Rubber Co., Ltd., Tokyo, Japan

[22] Filed: Sept. 4, 1974

[21] Appl. No.: 503,209

[30] Foreign Application Priority Data

Sept. 5, 1973 Japan ............................. 48-99966

[52] U.S. Cl. .................. 526/259; 526/113; 526/114; 526/126; 526/136; 526/142
[51] Int. Cl.$^2$ ............ C08F 26/06
[58] Field of Search .......... 526/113, 114, 126, 259, 526/258

[56] References Cited

UNITED STATES PATENTS

| | | | |
|---|---|---|---|
| 3,494,897 | 2/1970 | Reding | 260/78.5 |
| 3,557,062 | 1/1971 | Vergne | 260/78.4 |
| 3,707,520 | 12/1972 | Pampus | 260/33.6 AQ |
| 3,816,382 | 6/1974 | Streck | 260/93.1 |
| 3,856,758 | 12/1974 | Ueshima | 260/78.4 N |

*Primary Examiner*—Christopher A. Henderson
*Attorney, Agent, or Firm*—Ladas, Parry, Von Gehr, Goldsmith & Deschamps

[57] ABSTRACT

Novel polymers or copolymers of norbornene-carboxylic acid amides can be obtained by contacting, in the presence or absence of an inert solvent, (I) at least one compound selected from the group consisting of 5-norbornene-2-carboxylic acid amide, 5-norbornene-2,3-dicarboxylic acid diamide and substituted derivatives thereof, or (II) a mixture of the said compound (I) with at least one compound selected from the group consisting of norbornenes having at least one substituent selected from the group consisting of ester groups, nitrile groups, esterified hydroxyl groups, acid imide groups, halogens and acid anhydride groups and cyclic olefins, with a catalyst composed of (a) at least one compound selected from the group consisting of compounds of W, Mo and Re and (b) at least one compound selected from the group consisting of compounds of elements of Groups IA, IIA, IIB, IIIA, IVA and IVB of the Deming Periodic Table, said compounds having at least one element-carbon bond or element-hydrogen bond.

6 Claims, No Drawings

PROCESS FOR PRODUCING POLYMERS OR COPOLYMERS OF NORBORNENE-CARBOXYLIC ACID AMIDES

This invention relates to novel polymers containing amide groups and to a process for producing the same. More particularly, the invention is concerned with a process for producing novel polymers or copolymers, which have not been known hitherto, by contacting a norbornene derivative having as substituent an amide group, preferably a tertiary amide group, with a catalyst based on a compound of W, Mo or Re, in the presence or absence of an inert solvent.

Polymers having amide groups as substituents in the molecule have a high water-solubility or hydrophilic property and a specific reactivity resulting from the amide group, and hence have recently been watched with keen interest as new elemental materials for high molecular weight materials such as flocculants, dialysis membranes and gel carriers. As typical polymers of this kind, there have been known acrylamide polymers which are prepared by polymerizing acrylamides with light, a radical initiator, an anionic initiator or the like, optionally in the presence of a suitable solvent. Although these polymers have many interesting properties as mentioned above, their fundamental skeleton is limited and have no reactive sites other than the amide groups, so that there has been a certain limit as to the improvement or modification in properties of these polymers.

An object of the present invention is to provide novel polymers having amide groups which are entirely different in structure from the above-mentioned conventional polymers in that they are amide-containing polymers having cyclopentane rings and carbon-carbon double bonds in their main chains.

Another object of the present invention is to provide a process for producing the said novel polymers.
CH—CH$_2$ These objects can be accomplished by subjecting norbornene derivatives having amide groups as substituents to ring-opening polymerization.

It is well known that when subjected to ring-opening polymerization in the presence of various catalysts including catalysts based on compounds of W or Mo, non-polar cycloolefins, representatives of which are cyclopentene and cyclooctene give industrially useful polymers. On the other hand, processes for polymerization of cycloolefins containing polar substituents such as ester or nitrile groups are being watched with interest in various fields as processes for the production of high molecular weight materials, but only few processes have heretofore been proposed because of difficulties such as inactivation of catalysts due to such polar substituents.

Examples of these polymerization processes are those in which carboxylic acid, ester, imide or alcohol derivatives of norbornenes are polymerized in emulsion in alcohol or water in the presence of a compound of Ru, Ir or Os (French Pat. Nos. 1,556,215 and 1,594,934) and those in which ester, nitrile or halogen derivatives of norbornenes are polymerized in the presence of a so-called Ziegler type catalyst containing as one component a compound of W, Mo or Ta (DOS 2,231,995).

However, no processes have ever been proposed hitherto as to the polymerization of norbornene derivatives having amide groups as substituents. It is well known in general that even when monomers containing a large quantity of a group which has a markedly great coordination force, such as amide group, are intended to be polymerized in the presence of a transition metal catalyst, no polymerization takes place because coordination of the catalyst with said groups precedes to poison the catalyst.

During the course of studies on polymerization of cycloolefins having polar substituents, the present inventors have contacted norbornene derivatives having amide groups as substituents with a catalyst based on W, Mo or Re to find, surprisingly, that polymers are produced. Based on this finding, the inventors have accomplished the present invention.

According to this invention, there is provided a polymer obtained by ring-opening polymerization of (I) at least one compound selected from the group consisting of 5-norbornene-2-carboxylic acid amide, 5-norbornene-2,3-dicarboxylic acid diamide and substituted derivatives thereof or (II) a mixture of said compound (I) with at least one compound selected from the group consisting of norbornenes having at least one substituent selected from the group consisting of ester groups, nitrile groups, esterified hydroxyl groups, acid imide groups, halogens and acid anhydride groups, and cycloolefins.

According to this invention, there is also provided a process for producing a novel polymer of a norbornene-carboxylic acid amide, which comprises contacting, in the presence or absence of an inert solvent, (I) at least one compound selected from the group consisting of 5-norbornene-2-carboxylic acid, 5-norbornene-2,3-dicarboxylic acid diamide and substituted derivatives thereof, or (II) a mixture of said compound (I) with at least one compound selected from the group consisting of norbornenes having at least one substituent selected from the group consisting of ester groups, nitrile groups, esterified hydroxyl groups, acid imide groups, halogens, and acid anhydride groups, with a catalyst composed of (a) at least one compound selected from the group consisting of compounds of W, Mo and Re and (b) at least one compound selected from the group consisting of compounds of elements of Groups IA, IIA, IIB, IIIA, IVA and IVB of the Deming Periodic Table (see Lange's Handbook of Chemistry, page 60), said compounds having at least one element-carbon or element-hydrogen bond.

According to the process of the present invention, polymers or copolymers of norbornene-carboxylic acid amides, which have not been known hitherto, can be produced with ease.

Characteristic features of the present invention are as follows:

1. Because of their containing amide groups, the polymers of the present invention have a high affinity with water and hence are extremely useful as so-called water-soluble high polymers.

2. Due to the reactivity of carbon-carbon double bonds in the main chain, the polymers of the present invention can be subjected to various modifications including photocrosslinking.

3. In the process of the present invention, polymers having various structures, such as from polymers rich in cis-C=C bond to polymers rich in trans-C=C bond, can be obtained by varying the catalyst components or other reaction conditions. This variation, coupled with the variation in copolymer composition and the above-mentioned modifications, makes it possible to control the properties of polymers over an extremely broad scope.

4. The polymers of the present invention have ordinarily a high molecular weight and excellent mechanical properties, and hence, can easily be formed into films and the like.

Constructive conditions of the present invention are explained in detail below.

Monomers suitable for use in the present invention are represented by the general formula,

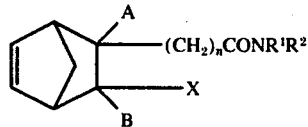

wherein $R^1$ and $R^2$ are independently a hydrogen atom or a hydrocarbon group having 1 to 10 carbon atoms, preferably the said hydrocarbon group, which may be saturated or unsaturated and may be any of alkyl, cycloalkyl, aryl and aralkyl groups; X is a hydrogen atom, a saturated alkyl group having 1 to 10 carbon atoms or a group of the formula, $-(CH_2)_{\overline{m}}CONR^3R^4$ where $R^3$ and $R^4$ are independently a hydrogen atom or the above-mentioned saturated or unsaturated hydrocarbon group, preferably the said hydrocarbon group, X being preferably a hydrogen atom or the said saturated alkyl group; $R^1$, $R^2$, $R^3$ and $R^4$ may be the same or different; A and B are independently an alkyl group having 1 to 10 carbon atoms, or a cycloalkyl, aralkyl or aryl group having up to 20 carbon atoms, and may be the same or different; and n and m are independently an integer of 0 to 10, preferably 0 or 1, most preferably $n=0$ and $m=0$.

Examples of monomers particularly preferable for use in the present process are N,N-dimethyl-5-norbornene-2-carboxylic acid amide, N,N-diethyl-5-norbornene-2-carboxylic acid amide, N,N-dicyclohexyl-5-norbornene-2-carboxylic acid amide, N,N-dimethyl-2-methyl-5-norbornene-2-carboxylic acid amide, N,N-diethyl-3-phenyl-5-norbornene-2-carboxylic acid amide, N,N-di-n-propyl-2-octyl-5-norbornene-2-carboxylic acid amide, N,N-di-t-butyl-3-cyclohexyl-5-norbornene-2-carboxylic acid amide, N,N-di-n-octyl-3-methyl-5-norbornene-2-carboxylic acid amide, and N,N,N',N'-tetramethyl-5-norbornene-2,3-dicarboxylic acid diamide.

Alternatively, there may be used compounds represented by the general formula,

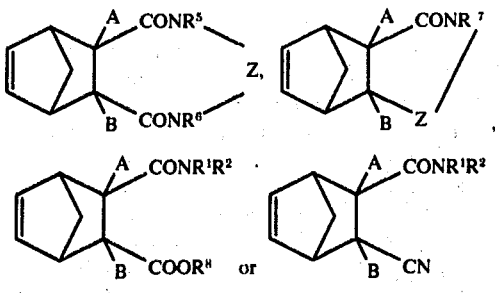

wherein $R^5$, $R^6$ and $R^7$ are independently a hydrogen atom or a saturated or unsaturated hydrocarbon group having 1 to 10 carbon atoms; $R^8$ is a saturated or unsaturated hydrocarbon group having 1 to 10 carbon atoms; and Z is an alkylene group having 1 to 10 carbon atoms. Examples of the said compounds are 4,7-dimethyl-4,7-diazatricyclo[8.2.1.0$^{2,9}$]tridec-11-ene-3,8-dione (formula (A)), 4-methyl-4-azatricyclo[6.2.1.0$^{2,7}$]undec-9-ene-3-one (formula (B)), N,N-dimethyl-2-methyl-3-methoxycarbonylbicyclo[2.2.1]hept-5-ene-2-carboxylic acid amide (formula (C)), and N,N-diethyl-3-cyanobicyclo[2.2.1]hept-5-ene-2-carboxylic acid amide (formula (D)).

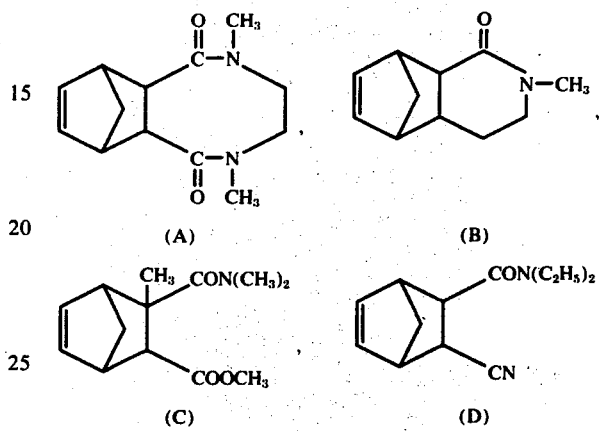

In the present process, it is also possible to use a mixture of the above-mentioned monomer with at least one polymerizable comonomer, thereby obtaining a copolymer thereof. Compounds suitable for use as such comonomers are selected from norbornenes containing polar substituents and cycloalkenes.

The norbornenes used as the comonomers are those containing ester group, nitrile group, imide group, acid anhydride group and/or halogen as polar substituents. Particularly preferable monomers are compounds represented by the general formula,

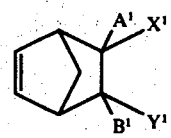

wherein $X^1$ and $Y^1$ are independently a hydrogen atom, a saturated or unsaturated hydrocarbon group having 1 to 10 carbon atoms, or a group of the formula,

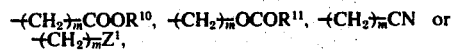

and
$X^1$ and $Y^1$ may, when taken together, form a group of the formula,

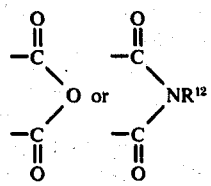

where $R^{10}$ and $R^{11}$ are independently a saturated or unsaturated hydrocarbon group having 1 to 20 carbon atoms; $R^{12}$ is a hydrogen atom or a saturated or unsaturated hydrocarbon group having 1 to 20 carbon atoms; $Z^1$ is a halogen; and $m$ is an integer of 0 to 10, at least one of $X^1$ and $Y^1$ being a group other than the hydrogen atom and the hydrocarbon group; and $A^1$ and $B^1$ are independently a hydrogen atom or a saturated or unsaturated hydrocarbon group having 1 to 10 carbon atoms. Concrete examples of the said compounds are methyl 5-norbornene-2-carboxylate, ethyl 5-norbornene-2-carboxylate, phenyl 5-norbornene-2-carboxylate, methyl 2-methyl-5-norbornene-2-carboxylate, butyl 3-phenyl-5-norbornene-2-carboxylate, dimethyl 5-norbornene-2,3-dicarboxylate, cyclohexyl 5-norbornene-2-carboxylate, allyl 5-norbornene-2-carboxylate, 5-norbornene-2-yl acetate, 5-norbornene-2-nitrile, 3-methyl-5-norbornene-2-nitrile, 2,3-dimethyl-5-norbornene-2,3-dinitrile, 5-norbornene-2,3-dicarboxylic acid anhydride, 2,3-dimethyl-5-norbornene-2,3-dicarboxylic acid anhydride, 5-norbornene-2,3-dicarboxylic acid imide, N-phenyl-2-methyl-5-norbornene-2,3-dicarboxylic acid imide, 5-chloro-2-norbornene, 6-methyl-5-bromo-2-norbornene, and mixtures thereof, though these are not limitative. In some cases, it is, of course, possible to use as the comonomer tetracyclic compounds represented by the general formula,

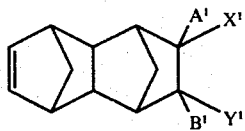

wherein $A^1$, $B^1$, $X^1$ and $Y^1$ are as defined above.

Further, the cycloalkenes used as the comonomer in the present process include various compounds. Particularly preferable monomers are cyclobutene, cyclopentene, cyclooctene, 1,5-cyclooctadiene, 1,5,9-cyclododecatriene, norbornene, 5-methylnorbornene, 5-phenylnorbornene, dicyclopentadiene, dihydrodicyclopentadiene and norbornadiene.

In the present invention, the norbornene having amide groups and the comonomer copolymerizable therewith may be used in any proportions, though are preferably used in a ratio in the range from 100:0 to 5:95.

The catalyst used in the polymerization or copolymerization according to the present process is prepared by reacting the aforesaid component (a) with the aforesaid component (b).

Compounds of W, Mo or Re suitable as the component, (a), include halides, oxyhalides, alkoxyhalides, alkoxides, carboxylic acid salts, acetyl acetonates, oxyacetyl acetonates, carbonyl complexes, and derivatives and mixtures thereof. Among these, halides, oxyhalides and alkoxyhalides are particularly preferable. Further, mixtures of two or more compounds capable of forming these compounds are also included. The above-mentioned compounds may have been complexed with a proper complexing agent, e.g. $PPh_3$, $C_5H_5N$ or the like. Examples of such compounds are $WCl_6$, $WCl_5$, $WCl_4$, $WBr_6$, $WF_6$, $WI_6$, $MoCl_5$, $MoCl_4$, $MoCl_3$, $ReCl_5$, $WOCl_4$, $MoOCl_3$, $ReOCl_3$, $ReOBr_3$, $W(OPh)_6$, $WCl_2(OPh)_4$, $Mo(OC_2H_5)_2Cl_3$, $Mo(OC_2H_5)_5$, $MoO_2(acac)_2$, $W(OCOR)_3$, $W(CO)_6$, $Mo(CO)_6$, $Re_2(CO)_{10}$, $ReOBr_3\cdot PPh_3$, $WCl_5\cdot PPh_3$ and $WCl_6\cdot C_5H_5N$, in which Ph is phenyl, acac is acetyl acetonate, and R is a hydrocarbon group.

Compounds suitable as the component (b) include compounds of elements of Groups IA, IIA, IIIA, IVA and IVB of the Deming Periodic Table which have at least one element-carbon bond and those having at least one element-hydrogen bond. Examples of the compounds having at least one element-carbon bond are $n-C_4H_9Li$, $n-C_5H_{11}Na$, $C_5H_5Na$, $CH_3MgI$, $C_2H_5MgBr$, $CH_3MgBr$, $n-C_3H_7MgCl$, $t-C_4H_9MgCl$, $CH_2=CH-MgCl$, $(C_2H_5)_2Zn$, $(C_2H_5)_2Cd$, $CaZn(C_2H_5)_4$, $(CH_3)_3B$, $(C_2H_5)_3B$, $(n-C_4H_9)_3B$, $(CH_3)_3Al$, $(C_2H_5)_3Al$, $(C_2H_5)_3Al\cdot O(C_2H_5)_2$, $(C_2H_5)_2AlCl$, $C_2H_5AlCl_2$, $(C_2H_5)_2AlH$, $(iso-C_4H_9)_2AlH$, $(C_2H_5)_2AlOC_2H_5$, $(iso-C_4H_9)_3Al$, $(C_2H_5)_3Al_2Cl_3$, $(CH_3)_4Ge$, $(CH_3)_4Sn$, $(n-C_4H_9)_4Sn$, $(C_2H_5)_3SiH$, $(n-C_6H_{13})_3Al$, $(n-C_8H_{17})_3Al$ and mixtures thereof. Examples of the compounds having at least one element-hydrogen bond are $LiH$, $NaH$, $CaH_2$, $B_2H_6$, $AlH_3$, $SiH_4$ and $TiH_4$. It is also possible to use mixtures of two or more compounds capable of forming the said compounds upon reaction.

The molar ratio of the component (a) to the component (b) is in the range from 1:1 to 1:20, preferably 1:2 to 1:10.

Ordinarily, a catalyst prepared from the above-mentioned components (a) and (b) has a high activity on the polymerization in the present invention. If desired, however, the catalyst may be given higher activity, or a varying reactivity ratio in copolymerization, by addition of a component (c) (activating agent), such as an alcohol, a hydroperoxide, a peroxide, water and an epoxide. The amount of the component (c) varies depending on its kind and on the kind of the components (a) and (b), though is ordinarily in the range of 0.5 to 20 moles, preferably 1 to 10 moles, per mole of the metal atom of the component (a).

In the present invention, the mixing order of the catalyst components (a) and (b) is not particularly limited, though ordinarily, a mixture of the monomer and one of the components is incorporated with the other component. Further, the addition order of the component (c) is also not particularly limited, though preferably, a reaction mixture of the component (a) [or (b)] and the component (c) is incorporated with the component (b) [or (a)].

The amount of the catalyst, in terms of the amount of the component (a), is in the range of 200 to 0.1 mmol., preferably 50 to 0.2 mmol., per mole of the monomer or the monomer mixture.

The reaction of the present invention may be effected in the presence or absence of solvent. Suitable solvents usable in the present invention include hydrocarbons such as hexane, heptane, benzene, toluene and cyclohexane; halogenated hydrocarbons such as chloroform, 1,2-dichloroethane and chlorobenzene; ethers such as diethyl ether, dibutyl ether, diphenyl ether and tetrahydrofuran; esters such as ethyl acetate and methyl propionate; and mixtures thereof. However, any solvent may be used unless it inactivates the catalyst components at the time of polymerization according to the present invention.

The temperature suitable for practice of the present process is in the range of $-30°$ to $+200°$ C, though a temperature of $0°$ to $+150°$ C is ordinarily preferable.

The molecular weight of the polymer or copolymer obtained according to the polymerization of the present invention can be controlled by varying reaction conditions, such as kind and concentration of catalyst, polymerization temperature, kind of solvent, concentration of monomer and the like, though it is preferably controlled by adding to the reaction system a proper amount of a hydrocarbon having in the molecule at least one carbon-carbon double or triple bond, such as α-olefin or α,ω-diolefin; or a polar allyl compound represented by the formula,

CH₂ = CR'CR''R'''X or

(CH₂ = CR'CR''R''')ₙY wherein R', R'' and R''' are independently hydrogen or hydrocarbon group having 1 to 10 carbon atoms, X is a halogen atom, or an —OR^a,

—OCR^b
‖
O or —NR^cR^d group in which R^a, R^b, R^c and R^d are independently hydrogen or a saturated or unsaturated hydrocarbon group having 1 to 20 carbon atoms, Y is a polybasic acid residue and n is the basisity of the polybasic acid. According to this procedure, the molecular weight of the polymer or copolymer can be controlled without essential change in yield or various properties, such as microstructure and the like of the polymer.

Any concentration of the monomer may be used, though a concentration of at least 0.1% by weight is preferable. The present process can be practiced in either homogeneous or heterogeneous system, and in either batch-wise or continuous manner. Since the catalyst used in the present process is relatively unstable to oxygen and moisture in the air, the reaction is ordinarily carried out in an atmosphere of an inert gas such as nitrogen, helium or argon, and the monomer and the solvent are desirably subjected to degasification and dehydration prior to use.

The polymer produced according to the present process may be recovered from its solution in a conventional manner including the addition of a nonsolvent, e.g. a lower alcohol such as ethanol or methanol.

The polymer can be stabilized against the action of oxygen by incorporation of a known antioxidant such as, for example, 2,6-di-tert-butyl-4-methylphenol, 2,2'-dioxy-3,3'-di-tert-butyl-5,5'-dimethylphenylmethane or phenyl-β-naphthylamine.

The polymers and copolymers obtained according to the present process may be obtained in various states, such as from rubbery state to hard resin state, depending on the kind of monomer or comonomer used and the reaction conditions, and hence, are not only usable as elastomers, molding materials, paints and coating films, but also can effectively be used in fields where hydrophilic properties are required. Further, by virtue of diverse reactivities of amide groups, other functional groups and carbon-carbon double bonds contained in the molecule, the polymers or copolymers can be used as starting materials for many novel polymers.

The present invention is explained in more detail below with reference to examples, but the examples are by way of illustration and not by way of limitation.

EXAMPLE 1

A 50-me glass ampoule was sufficiently washed and dried, and then flushed with nitrogen. Into this ampoule were charged 5 ml of dehydrated chlorobenzene and 1 ml of a chlorobenzene solution of WCl₆ (concentration 0.05 mol/l.), and the ampoule was cooled to 0° C. To this system were added 0.2 ml of a chlorobenzene solution of Al(C₂H₅)₃ (concentration 0.5 mol/l.) and then 1.6 ml of N,N-dimethyl-5-norbornene-2-carboxylic acid amide

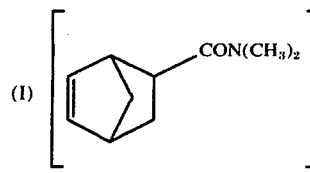

Subsequently, the ampoule was sealed, and the mixture in the ampoule was reacted with shaking for 17 hours in a thermostat at 70° C. After the reaction, a small amount of methanol was added to the reaction mixture and the resulting mixture was then added to petroleum ether containing 2,6-di-tert-butyl-p-cresol. The thus precipitated polymer was sufficiently washed with petroleum ether containing a small amount of methanol and successively with petroleum ether, and then dried under reduced pressure to obtain a pale yellow resinous product in a yield of 71%. This product was soluble in methanol, chloroform, chlorobenzene and hot toluene, and was insoluble in hexane and water. From the infrared absorption spectrum and NMR spectrum of the product, it was suggested that a polymer having repeating unit (II) shown below was produced.

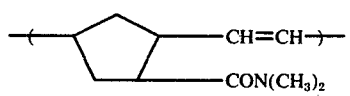

EXAMPLE 2

The procedure of Example 1 was repeated, except that the chlorobenzene solution of WCl₆ was replaced by a chlorobenzene solution of W(OC₆H₅)₆, to obtain a resinous product in a yield of 84%. The infrared absorption spectrum of this product was substantially identical with that of the polymer obtained in Example 1. The thus obtained polymer softened at about 150° C. This polymer was cast from its chloroform solution to obtain a tough, transparent film. This film was dried at 60° C under vacuum until the weight became constant, and then immersed in water at 30° C for 72 hours. The water absorption of the film was measured to find that it was 45%. The polymer film had a sufficient mechanical strength even after the water absorption.

EXAMPLES 3 – 7

In the same manner as in Example 1, polymerization in chlorobenzene of 1.6 ml of the compound (I) was carried out at 70° C for 17 hours, using a system containing 0.05 mmol. of WCl₆ in combination with one of the compounds (cocatalysts) shown in Table 1. The results obtained were as set forth in Table 1.

Table 1

| Example | Cocatalyst Kind | Amount (mmol.) | Polymer yield (%) |
|---|---|---|---|
| 3 | Al₂(C₂H₅)₃Cl₃ | 0.2 *1) | 10 |
| 4 | Zn(C₂H₅)₂ | 0.2 | 6 |
| 5 | Sn(CH₃)₄ | 0.1 | 1 |
| 6 | SiH(C₂H₅)₃ | 0.2 | 0.5 |

Table 1-continued

| Example | Cocatalyst Kind | Cocatalyst Amount (mmol.) | Polymer yield (%) |
|---|---|---|---|
| 7 | NaH | ca. 1.0 | 1 |

*1) mmol. of Al atom All of the thus obtained polymers were resinous.

EXAMPLE 8

The procedure of Example 1 was repeated, except that the chlorobenzene solution of $WCl_6$ was replaced by 1 ml of a chlorobenzene solution of $MoCl_5$ (concentration 0.05 mol/l.) and the chlorobenzene solution of $Al(C_2H_5)_3$ was replaced by 0.5 ml of a chlorobenzene solution of $Al(C_2H_5)Cl_2$ (concentration 0.4 mol/l.), to obtain a resinous polymer in a yield of 54%.

EXAMPLE 9

The procedure of Example 8 was repeated, except that the chlorobenzene solution of $Al(C_2H_5)Cl_2$ was replaced by 0.032 ml (0.2 mmol.) of $SiH(C_2H_5(_3$, to obtain a polymer in a )$_{of}$ 2%.

EXAMPLE 10

The procedure of Example 1 was repeated, except that the chlorobenzene solution of $WCl_6$ was replaced by 1 ml of a chlorobenzene solution of $ReCl_5$ (concentration 0.05 mol/l.), to obtain a resinous polymer in a yield of 1.5%.

EXAMPLE 11

Into the same 50-ml glass ampoule as in Example 1 was charged under a nitrogen atmosphere a mixture of 10 ml of chlorobenzene, 1.6 ml of the compound (I) and 1.5 ml of methyl 5-norbornene-2-carboxylate

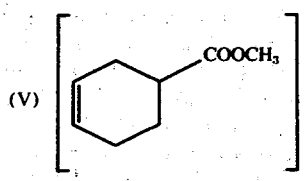

To this system were added 2 ml of a chlorobenzene solution of $WCl_6$ (concentration 0.05 mol/l.) and 0.5 ml of a chlorobenzene solution of $Al(C_2H_5)_3$ (concentration 0.4 mol/l.). Subsequently, the ampoule was sealed, and the mixture in the ampoule was reacted with shaking for 20 hours in a thermostat at 70° C. After the reaction, the reaction mixture was treated in the same manner as in Example 1 to obtain 2.9 g of a pale brown resinous product (yield 89%).

The product was soluble in methanol, which is a non-solvent for a polymer of the compound (V), and its IR spectrum showed at 1625 cm$^{-1}$ and 1735 cm$^{-1}$ absorptions resulting from >C=O of amide and ester groups, respectively. From this, it was found that the product was a copolymer composed of the compound (I) and the compound (V).

EXAMPLE 12

The procedure of Example 11 was repeated, except that the compound (V) was replaced by 0.9 ml of cyclooctene, to obtain 1.2 g of a brown resinous product (yield 50%). The thus obtained product was soluble in a 10:1 (volume) mixture of methanol and chlorobenzene which is a non-solvent for polycyclooctene.

EXAMPLE 13

As in Example 11, a 50-ml glass ampoule was charged under a nitrogen atmosphere with 2 ml of a toluene solution of $WCl_6$ (concentration 0.05 mol/l.), 1.8 ml of 5-norbornene-2-nitrile

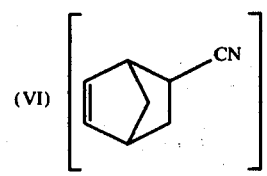

2.4 ml of the compound (I) and 10 ml of 1,2-dichloroethane, in the order described. To this mixture were added 0.2 ml of a toluene solution of 1-hexene (concentration 0.5 mol/l.) and 0.3 ml of a toluene solution of $Al(C_2H_5)_3$ (concentration 1.0 mol/l.). The ampoul was subsequently sealed, and the mixture was reacted with shaking for 17 hours in a thermostat at 50° C. After the reaction, the reaction mixture was treated in the same manner as in Example 1 to obtain 1.3 g of a pale brown tough product (yield 31%).

The product was soluble in methanol, which is a non-solvent for the polymer of compound (VI). Furthermore its IR spectrum showed absorptions at 2210 cm$^{-1}$ characteristic of the nitrile group as well as the one at 1625 cm$^{-1}$ assignable to the amide >C=O group. Thus, it was confirmed that a copolymer composed of the compounds (I) and (VI) was obtained.

EXAMPLE 14

1.0 g of N-n-propyl-5-norbornene-2,3-dicarboxylic acid imide

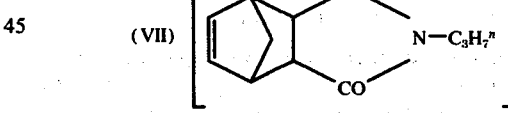

was weighed into a 50-ml glass ampoule and dried in vacuo for 2 hours at 25° C. The ampoule was filled with dry nitrogen and 1.6 ml of compound (I), 1 ml of a toluene solution of $WCl_6$ (concentration 0.05 mol/l.) 10 ml of 1,2-dichloroethane were added and the mixture was thoroughly shaked to obtain a homogeneous solution. To this system was added 0.15 ml of a toluene solution of $Al(C_2H_5)_3$ (concentration 1.0 mol/l.). Subsequently, the ampoule was sealed and shaken for 14 hours in a thermostat at 50° C. After the reaction, the reaction mixture was treated in the same manner as in Example 1 to obtain 1.3 g of a product (yield 50%).

The product was soluble in methanol, which is a non-solvent for the polymer of the compound (VII), and its IR spectrum showed absorptions at 1625 cm$^{-1}$ and 1690 cm$^{-1}$ resulting from >C=O of the amide and imide groups, respectively, thus confirming the formation of a copolymer of the compounds (I) and (VII).

EXAMPLE 15

The procedure of Example 14 was repeated, except that the compound (VII) was replaced by 0.5 g of 5-norbornene-2,3-dicarboxylic acid anhydride

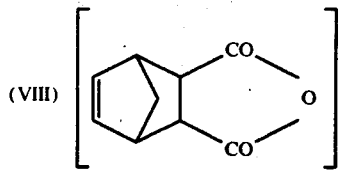

(VIII)

and 2.0 ml instead of 1.6 ml of compound (I) was used, to obtain 1.4 g (yield 55%) of a brown resinous product.

The product obtained was soluble in methanol which is a non-solvent for the polymer of the compound (VIII). It IR spectrum showed strong absorptions at 1625 cm$^{-1}$ and 1780 cm$^{-1}$ resulting from >C=O of amide and cyclic anhydride groups, respectively.

EXAMPLE 16

Into the same 50-ml glass ampoule as in Example 1 were charged under a nitrogen atmosphere 0.5 ml of a toluene solution of WCl$_6$ (concentration 0.05 mol/l.) and 0.006 g (0.025 mmol.) of benzoyl peroxide. The mixture was shaken and allowed to stand for 10 minutes at 25° C. Then, 2 ml of compound (I), 8 ml of 1,2-dichloroethane, 0.38 ml of a toluene solution of Al(C$_2$H$_5$)$_3$ (concentration 0.2 mol/l.) were subsequently added (Ampoule A).

In a reference experiment, the above procedure was repeated without the addition of benzoyl peroxide (Ampoule B).

The ampoules were sealed and the mixtures were reacted with shaking for 17 hours in a thermostat at 50° C. After the reaction, the reaction mixtures were treated in the same manner as in Example 1. The yield of polymer in Ampoule A was 0.61 g (31%) compared with 0.48 g (24%) in Ampoule B.

EXAMPLE 17

The procedure of Example 16 was repeated, except that the benzoyl peroxide was replaced by 0.38 ml of a toluene solution of styrene oxide (concentration 0.1 mol/l.). The yield of polymer in Ampoule A was 0.64 g (32%) compared with 0.48 g (24%) in Ampoule B.

EXAMPLE 18

The procedure of Example 16 was repeated, except that the benzoyl peroxide was replaced by 0.13 ml of a toluene solution of ethanol (concentration 0.1 mol/l). The yield of polymer in Ampoule A was 0.55 g (28%) compared with 0.48 g (24%) in Ampoule B.

What is claimed is:

1. A polymer obtained by ring-opening polymerization of (I) at least one compound selected from the group consisting of monomers represented by the formula,

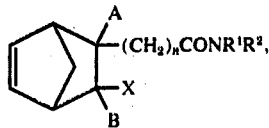 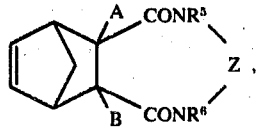

-continued

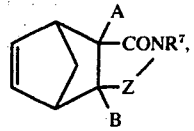 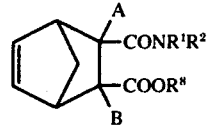

and 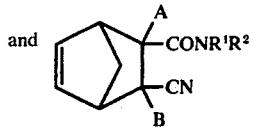

wherein R$^1$ and R$^2$ are independently a hydrogen atom or a saturated or unsaturated hydrocarbon group having 1 to 10 carbon atoms; X is a hydrogen atom, an alkyl group having 1 to 10 carbon atoms or a group of the formula;

$-(CH_2)_m-CONR^3R^4$ wherein R$^3$ and R$^4$ are independently a hydrogen atom or a saturated or unsaturated hydrocarbon group having 1 to 10 carbon atoms; R$^1$ R$^2$, R$^3$ and R$^4$ may be the same or different; R$^5$, R$^6$ and R$^7$ are independently a hydrogen atom or a saturated or unsaturated hydrocarbon group having 1 to 10 carbon atoms; A and B are independently an alkyl group having 1 to 10 carbon atoms or a cycloalkyl, aralkyl or aryl group having up to 20 carbon atoms, and may be the same or different; Z is an alkylene group having 1 to 10 carbon atoms; and n and m are independently an integer of 0 to 10.

2. A polymer according to claim 1, wherein the ring-opening polymerization is effected by contacting the starting monomer or monomers with a catalyst composed of (a) at least one compound selected from the group consisting of compounds of W, Mo and Re and (b) at least one compound selected from the group consisting of compounds of elements of Groups IA, IIA, IIB, IIIA, IVA and IVB of the Deming Periodic Table, said compounds having at least one element-carbon or element-hydrogen bond.

3. A polymer according to claim 1, wherein the starting monomer (I) is selected from the group consisting of N,N-dimethyl-5-norbornene-2-carboxylic acid amide, N,N-diethyl-5-norbornene-2-carboxylic acid amide, N,N-dicyclohexyl-5-norbornene-2-carboxylic acid amide, N,N-dimethyl-2-methyl-5-norbornene-2-carboxylic acid amide, N,N-diethyl-3-phenyl-5-norbornene-2-carboxylic acid amide, N,N-di-n-propyl-2-octyl-5-norbornene-2-carboxylic acid amide, N,N-di-t-butyl-3-cyclohexyl-5-norbornene-2-carboxylic acid amide, N,N-di-n-octyl-3-methyl-5-norbornene-2-carboxylic acid amide, N,N,N',N'-tetramethyl-5-norbornene-2,3-dicarboxylic acid diamide, 4,7-dimethyl-4,7-diazatricyclo[8.2.1.0$^{2,9}$] tridec-11-ene-3,8-dione, 4-methyl-4-azatricyclo[6.2.1.0$^{2,7}$]undec-9-ene-3-one, N,N-dimethyl-2-methyl-3-methoxycarbonylbicyclo[2.2.1]hept-5-ene-2-carboxylic acid amide, and N.N-diethyl-3-cyanobicyclo [2.2.1]hept-5-ene-2-carboxylic acid amide.

4. A polymer according to claim 1, wherein the starting monomer is at least one member selected from the group consisting of 5-norbornene-2-carboxylic acid amide.

5. A polymer according to claim 4, wherein the starting monomer is at least one member selected from the group consisting of N,N-dimethyl-5-norbornene-2-carboxylic acid amide, N,N-diethyl-5-norbornene-2-carboxylic acid amide, N,N-dicyclohexyl-5-norbornene-2-carboxylic acid amide, N,N-dimethyl-2-methyl-5-norbornene-2-carboxylic acid amide, N,N-diethyl-3-phenyl-5-norbornene-2-carboxylic acid amide, N,N-di-n-propyl-2-octyl-5-norbornene-2-carboxylic acid amide, N,N-di-t-butyl-3-cyclohexyl-5-norbornene-2-carboxylic acid amide, N,N-di-n-octyl-3-methyl-5-norbornene-2-carboxylic acid amide, 4-methyl-4-azatricyclo[6.2.1.0$^{2,7}$]undec-9-ene-3-one, N,N dimethyl-2-methyl-3-methoxycarbonybicyclo[2.2.1]hept-5-ene-2-carboxylic acid amide and N,N-diethyl-3-cyanobicyclo[2.2.1]hept-5-ene-2-carboxylic acid amide.

6. A polymer according to claim 1, wherein the starting monomer is N,N-dimethyl-5-norbornene-2-carboxylic acid amide.

* * * * *